United States Patent
Uliyar et al.

(10) Patent No.: US 10,257,395 B2
(45) Date of Patent: Apr. 9, 2019

(54) METHOD, APPARATUS AND COMPUTER PROGRAM PRODUCT FOR CREATING VIRTUAL REALITY CONTENT OF AN EVENT

(71) Applicant: Nokia Technologies Oy, Espoo (FI)

(72) Inventors: Mithun Uliyar, Bangalore (IN); Soumik Ukil, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/790,528

(22) Filed: Oct. 23, 2017

(65) Prior Publication Data
US 2018/0124291 A1    May 3, 2018

(30) Foreign Application Priority Data

Oct. 31, 2016    (IN) .............................. 201641037260

(51) Int. Cl.
*H04N 5/262*    (2006.01)
*H04N 5/247*    (2006.01)
(Continued)

(52) U.S. Cl.
CPC ........... *H04N 5/2224* (2013.01); *G06F 21/31* (2013.01); *G06F 21/34* (2013.01); *H04N 5/247* (2013.01);
(Continued)

(58) Field of Classification Search
CPC ...... H04N 5/2224; H04N 21/00; H04N 5/265; H04N 5/247; H04N 5/262; G06F 21/34; G06F 21/31
See application file for complete search history.

(56) References Cited

U.S. PATENT DOCUMENTS 8,838,140 B1    9/2014    Ledet
9,185,361 B2    11/2015    Curry
(Continued)

FOREIGN PATENT DOCUMENTS

WO    2015/027105 A1    2/2015

OTHER PUBLICATIONS

McCurdy et al., "A Systems Architecture for Ubiquitous Video", Proceedings of the 3rd international conference on Mobile systems, applications, and services, Jun. 6-8, 2005, pp. 1-14.
(Continued)

*Primary Examiner* — Hung H Lam
(74) *Attorney, Agent, or Firm* — Nokia Technologies Oy

(57) ABSTRACT

In an example embodiment, method, apparatus and computer program product are provided. The method includes facilitating receipt of a plurality of VR contents and a plurality of video contents associated with an event captured by a plurality of VR cameras and a plurality of user camera devices, respectively. Each of the plurality of VR cameras comprises a plurality of camera modules with respective field of views (FOVs) associated with the event. The FOVs of the plurality of user camera devices are linked with respective FOVs of camera modules of the plurality of VR cameras based on at least a threshold degree of similarity between the FOV of the user camera device and the FOV of the camera module. The processor creates an event VR content by combining the plurality of VR contents and the plurality of video contents based on the linking of the FOVs.

20 Claims, 8 Drawing Sheets

(51) Int. Cl.
*H04N 5/222* (2006.01)
*G06F 21/31* (2013.01)
*H04N 5/265* (2006.01)
*G06F 21/34* (2013.01)
*H04N 21/00* (2011.01)

(52) U.S. Cl.
CPC ............ *H04N 5/262* (2013.01); *H04N 5/265* (2013.01); *H04N 21/00* (2013.01)

(56) References Cited

U.S. PATENT DOCUMENTS

| | | | |
|---|---|---|---|
| 2004/0032495 A1 | 2/2004 | Ortiz | |
| 2010/0128103 A1 | 5/2010 | Sim et al. | |
| 2014/0294361 A1 | 10/2014 | Acharya et al. | |
| 2016/0337612 A1* | 11/2016 | Im | G06T 19/006 |
| 2017/0048334 A1* | 2/2017 | Shibahara | H04L 67/146 |
| 2017/0286993 A1* | 10/2017 | Khalid | G06Q 30/0241 |
| 2017/0300742 A1* | 10/2017 | Wei | G06K 9/00288 |
| 2018/0039079 A1* | 2/2018 | Lin | G06F 3/0346 |

OTHER PUBLICATIONS

"Perch Lets You Turn Nearly Any Device with a Camera into a Smart Home Security System", TheNextWeb, Retrieved on Oct. 25, 2017, Webpage available at : https://thenextweb.com/apps/2015/10/14/perch-lets-you-turn-nearly-any-device-with-a-camera-into-a-smart-home-security-system/.

* cited by examiner

METHOD, APPARATUS AND COMPUTER PROGRAM PRODUCT FOR CREATING VIRTUAL REALITY CONTENT OF AN EVENT

TECHNICAL FIELD

Various implementations relate generally to virtual reality content and, more specifically to method, apparatus, and computer program product for creating virtual reality content of an event.

BACKGROUND

Traditionally, real time broadcasting of an event shows a jitter when views of the event are switched. For example, when a game of cricket is broadcasted, a view from the bowler's end when he starts to run up and deliver the ball may largely vary when the view is shifted to a view where the batsman strikes the ball. Various techniques, for example, technologies that use a filler image that was captured in the past are used to avoid jitter and provide seamless transition between multiple views of the event. However, the filler images are not obtained in real time and switching between the multiple views may display a disconnect between the different views. Therefore, a real-time solution for broadcasting events without jitter while switching between multiple views of the cameras is desirable.

SUMMARY OF SOME EMBODIMENTS

Various aspects of example embodiments are set out in the claims.

In a first aspect, there is provided a method comprising: facilitating receipt of a plurality of virtual reality (VR) contents associated with an event by a processor, the plurality of VR contents captured by a plurality of VR cameras, each of the plurality of VR cameras comprising a plurality of camera modules with respective field of views (FOVs) associated with the event; facilitating receipt of a plurality of video contents associated with the event by the processor, the plurality of video contents captured by a plurality of user camera devices; linking FOVs of the plurality of user camera devices with FOVs of relevant camera modules of the plurality of VR cameras, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and creating an event VR content by combining the plurality of VR contents and the plurality of video contents based on the linking of the FOVs of the plurality of user camera devices with FOVs of the relevant camera modules of the plurality of VR cameras.

In a second aspect, there is provided an apparatus comprising at least one processor; a plurality of virtual reality (VR) cameras electrically coupled with the at least one processor; and at least one memory comprising computer program code, the at least one memory and the computer program code configured to, with the at least one processor, cause the apparatus to at least perform: facilitate receipt of a plurality of VR contents associated with an event, the plurality of VR contents captured by the plurality of VR cameras, each of the plurality of VR cameras comprising a plurality of camera modules with respective field of views (FOVs) associated with the event; facilitate receipt of a plurality of video contents associated with the event, the plurality of video contents captured by a plurality of user camera devices; link FOVs of the plurality of user camera devices with FOVs of relevant camera modules of the plurality of VR cameras, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and create an event VR content by combining the plurality of VR contents and the plurality of video contents based on the linking of the FOVs of the plurality of user camera devices with FOVs of the relevant camera modules of the plurality of VR cameras.

In a third aspect, there is provided a computer program product comprising at least one computer-readable storage medium, the computer-readable storage medium comprising a set of instructions, which, when executed by at least one processor, cause an apparatus to at least perform: facilitate receipt of a plurality of virtual reality (VR) contents associated with an event, the plurality of VR contents captured by a plurality of VR cameras, each of the plurality of VR cameras comprising a plurality of camera modules with respective field of views (FOVs) associated with the event; facilitate receipt of a plurality of video contents associated with the event, the plurality of video contents captured by a plurality of user camera devices; link FOVs of the plurality of user camera devices with FOVs of relevant camera modules of the plurality of VR cameras, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and create an event VR content by combining the plurality of VR contents and the plurality of video contents based on the linking of the FOVs of the plurality of user camera devices with FOVs of the relevant camera modules of the plurality of VR cameras.

In a fourth aspect, there is provided an apparatus comprising: means for facilitating receipt of a plurality of virtual reality (VR) contents associated with an event by a processor, the plurality of VR contents captured by a plurality of VR cameras, each of the plurality of VR cameras comprising a plurality of camera modules with respective field of views (FOVs) associated with the event; means for facilitating receipt of a plurality of video contents associated with the event by the processor, the plurality of video contents captured by a plurality of user camera devices; means for linking FOVs of the plurality of user camera devices with FOVs of relevant camera modules of the plurality of VR cameras, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and means for creating an event VR content by combining the plurality of VR contents and the plurality of video contents based on the linking of the FOVs of the plurality of user camera devices with FOVs of the relevant camera modules of the plurality of VR cameras.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are explained by referring to FIGS. 1 through 9 of the drawings.

Figure 1:
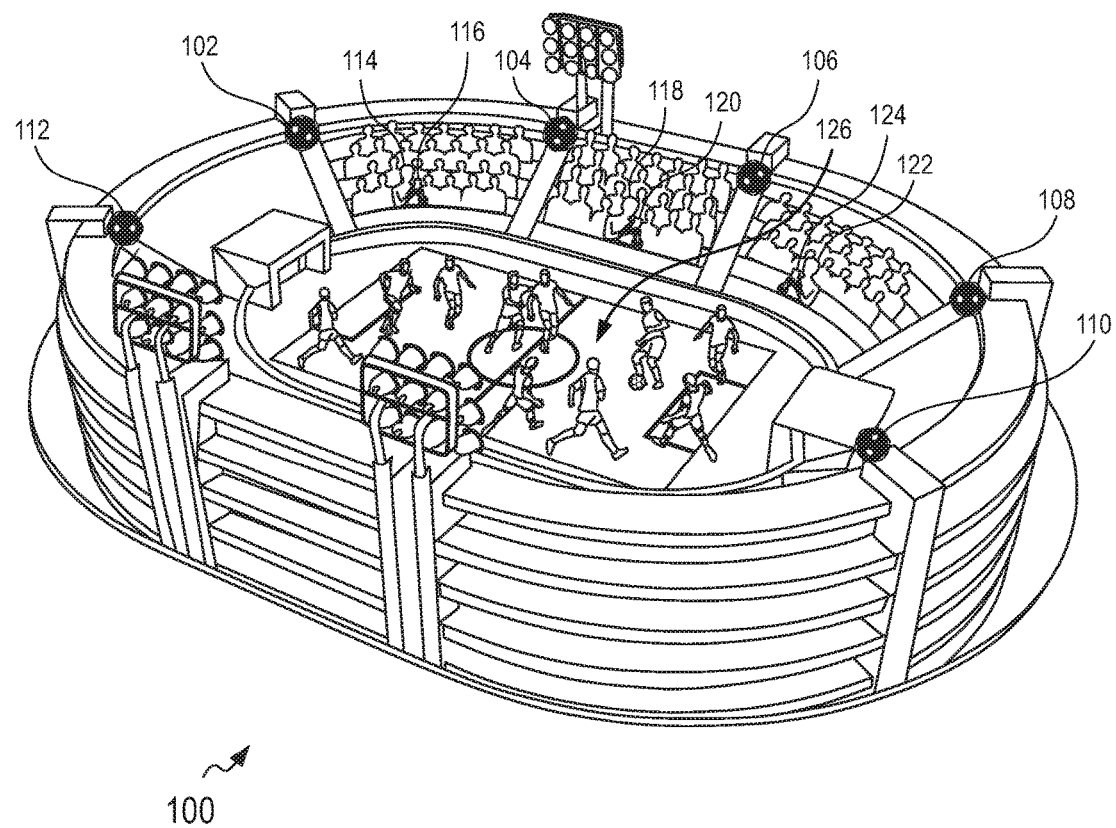
FIG. 1 illustrates an example representation of an event where at least some example embodiments can be implemented.

FIG. 1 illustrates an example representation of an environment (e.g., a football stadium 100) for event capture, where or in relation of which, at least one example embodiment of the present disclosure can be implemented. It should be understood, however, that the stadium 100 as illustrated and hereinafter described is merely illustrative of an arrangement for describing some example embodiments, and therefore, should not be taken to limit the scope of the embodiments. As such, it should be noted that at least some of the components described below in connection with the stadium 100 may be optional and thus in some example embodiments may include more, less or different components than those described in connection with the example embodiment of FIG. 1 or with subsequent FIGS. 2 to 9.

As shown in FIG. 1, a plurality of virtual reality (VR) cameras, for example, VR cameras 102, 104, 106, 108, 110, 112 are mounted at different locations in the stadium 100. The VR camera 102 to 112 may be configured to continuously capture VR video content associated with a football field 126 and other parts of the stadium 100. In an example embodiment, each of the VR cameras 102 to 112, for example, the VR camera 102 includes multiple camera modules that are positioned with respect to each other such that they have overlapping field of views (FOVs), and a 360 degree 3-D view of the scene surrounding the VR camera 102 can be obtained based on images/image frames captured individually by the camera modules of the VR camera 102. The VR cameras 102 to 112 may be in communication with other imaging circuitries and/or software, and are configured to capture digital images or to capture video or other graphic media of the football field 126 and other parts of the stadium 100. In an example embodiment, the VR cameras 102 to 112 are communicably coupled to each other and to an apparatus (not shown in FIG. 1) for performing image processing operations, such as, creating event VR content and sending (e.g., broadcasting) the event VR content to intended viewers, where the event VR content is created, among other things, from the VR video contents captured from the one or more of the VR cameras 102 to 112.

As shown in the example representation of FIG. 1, spectators (also referred to as users) 114, 118, 122 in the stadium 100 may also contribute video contents associated with the event that can be used along with VR contents captured by the VR cameras 102 to 112 to create the event VR content. In various example embodiments, video contents provided by the users 114, 118 and 122 can be used for achieving seamless transition between multiple views of the VR cameras 102 to 112 while viewing the event VR content. Each of the users 114, 118 and 122 may have user camera devices for capturing video contents associated with the event in the stadium 100. For instance, the user 114 has a user camera device 116, the user 118 has a user camera device 120 and the user 122 has a user camera device 124 for capturing the video contents. In an example embodiment, the user camera devices 116, 120 and 124 (hereinafter also referred to as 'user devices') have communication capability to communicate with a network and to perform various operations that include capturing video contents of the event (e.g., game played in the stadium 100) and transferring the captured video contents to the apparatus (described later with reference to FIGS. 5 and 8) for creating the event VR content. The user devices 116, 120 and 124 can be any type of devices with image capture and communication capabilities, for example a smart phone including a camera device, a digital camera with communication capability or coupled with a communication device, or any portable electronic communication device including a camera device.

In an embodiment, the apparatus includes at least one processor to create the event VR content that may be viewable by an end user (e.g., viewer) based on the VR contents obtained from the VR cameras 102 to 112 and video contents obtained from the user camera devices 116, 120 and 124. The event VR content created by the apparatus provides a seamless transition between FOVs associated with the camera modules of the VR cameras 102 to 112 and FOVs associated with user devices 116, 120 and 124.

In this example representation, the user camera devices 116, 120 and 124 form a visual network along with the VR cameras 102 to 112. In an example scenario that is not based on embodiments of the present disclosure, consider the VR camera 102 provides a stream of VR content (for example, VR stream 1) and the VR camera 108 provides a stream of VR content (for example, VR stream 2), and the VR stream 1 and the VR stream 2 are provided to a viewer as the event VR content. In this example scenario while watching the event VR content, if the viewer makes a transition from the VR stream 1 to the VR stream 2 (i.e. user selects a new stream (VR stream 2) for viewing purposes), such transition may not be seamless and may show a jitter because of significant difference in FOVs associated with camera modules of the VR camera 102 and camera modules of the VR camera 108. It would be appreciated that various example embodiments of present disclosure make use of real-time video contents captured by the users 114, 118, 122 through their user camera devices 116, 120 and 124 to provide a seamless transition of views for the viewers while switching between VR steams of the VR cameras 102 to 112. Various example embodiments of creating and providing event VR content for the viewers that enables a seamless transition of views between different streams of the VR contents provided by the VR cameras 102 to 112 positioned to capture the event, are described with reference to FIGS. 2 to 9.

Figure 2:
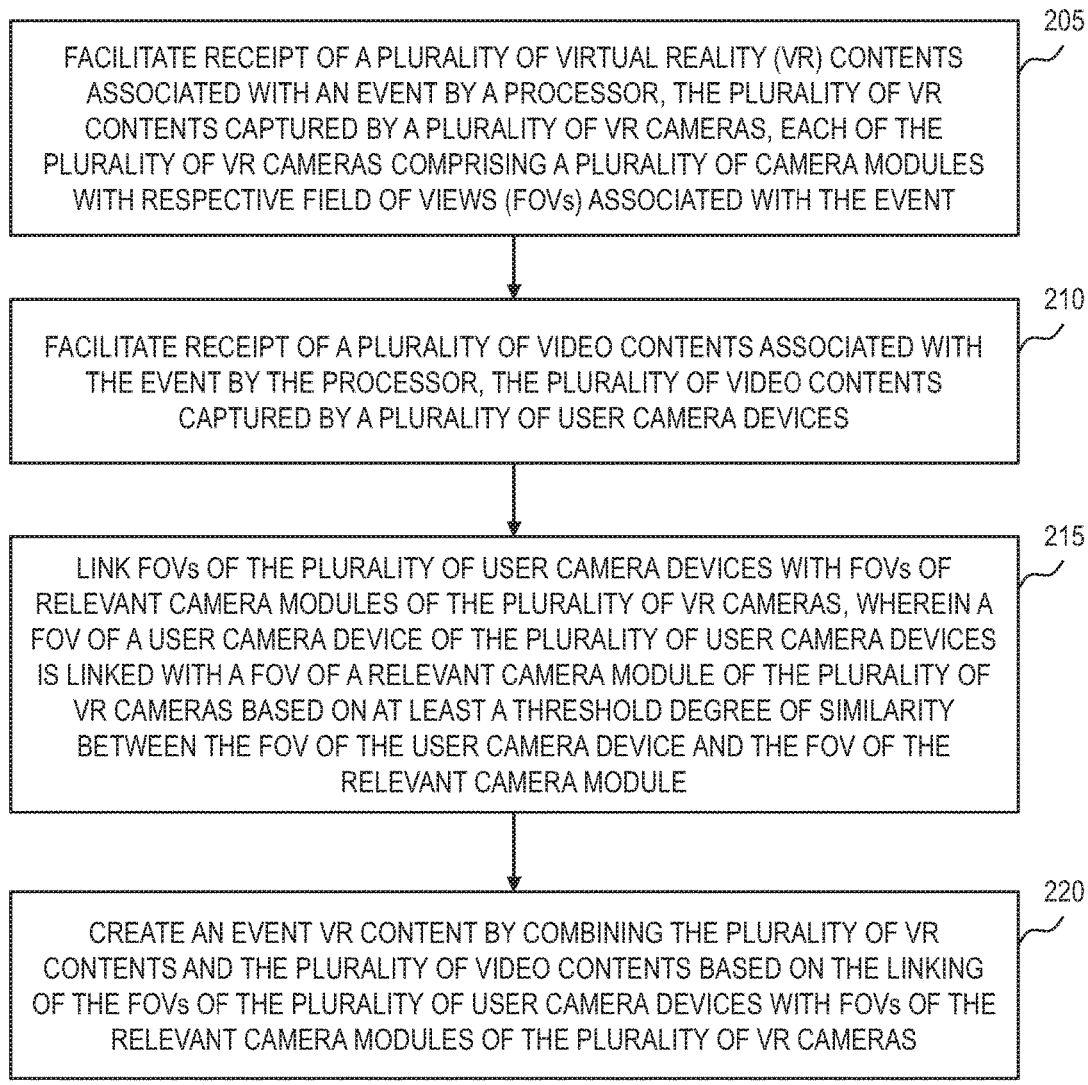
FIG. 2 is a flowchart depicting an example method for creating event virtual reality (VR) content, in accordance with an example embodiment.

FIG. 2 is a flowchart depicting an example method for creating event VR content, in accordance with an example embodiment. The method 200 depicted in the flowchart may be executed by, a processor for example, as explained with reference to the apparatus (e.g., VR content server 508 of FIG. 5 and an apparatus 800 of FIG. 8).

At operation 205, the method 200 includes facilitating receipt of a plurality of VR contents associated with an event by the processor. In an embodiment, the plurality of VR contents is captured by a plurality of VR cameras (e.g., $VR_1$, $VR_2$, ... $VR_n$). Each VR camera of the plurality of VR cameras comprises a plurality of camera modules (e.g., $M_1$, $M_2$ ... $M_k$) with respective field of views (FOVs) associated with the event. The plurality of camera modules (e.g., $M_1$, $M_2$ ... $M_k$) of a VR camera are positioned with respect to each other such that they have overlapping field of views and a 360 degree 3-D view of the scene surrounding the VR camera can be obtained based on the images/image frames captured individually by the camera modules ($M_1$, $M_2$ ... $M_k$) of the VR camera.

At operation 210, the method 200 includes facilitating receipt of a plurality of video contents associated with the event by the processor. In an embodiment, the plurality of video contents is captured by a plurality of user camera devices (e.g., $D_1$, $D_2$ ... $D_m$). In an example embodiment, the user camera devices may use a video application specific to the event capture installed or otherwise accessible to the user camera device, to capture the plurality of video contents. It is understood that the plurality of users may be present at different locations, and each user camera device captures the event depending upon a field of view associated with the user camera device.

At operation 215, the method 200 includes linking FOVs of the plurality of user camera devices with FOVs of relevant camera modules of the plurality of VR cameras. In an example embodiment, a FOV of a user camera device of the plurality of user camera devices is linked with a FOV of a relevant camera module of the plurality of VR cameras based on at least a threshold degree of similarity between the FOV of the user camera device and the FOV of the relevant camera module. Herein, at least in some example embodiments, the term 'linking' refers to a real-time determination of similarity between the FOV of the user camera device and the FOV of the relevant camera module, and if the similarity is more than the threshold degree of similarity, the FOV of the user camera device and the FOV of the relevant camera module are considered as linked. For instance, if a user camera device ($D_i$) is located in the vicinity of a virtual reality camera ($V_i$), the processor matches visual content captured by the user camera device $D_i$ with visual content captured by the camera modules ($M_1$, $M_2$ ... , $M_k$) of the virtual reality camera $V_i$. In this example, if the visual content (e.g., image frame of video content) of the user device $D_i$ has at least a threshold degree of similarity with visual content (an image frame of VR content) of a camera module $M_j$ from among the camera modules ($M_1$, $M_2$ ... , $M_k$), the camera module $M_j$ is selected as the relevant camera module and the user device $D_i$ is linked to the camera module $M_j$. Alternatively or additionally, the orientation of the user device $D_i$ may be compared with known orientations of the camera modules ($M_1$, $M_2$ ... , $M_k$) to determine the relevant camera module $M_j$ which has a similar orientation. For example, if there is at least a threshold degree of similarity in the orientations of the user device $D_i$ and the relevant camera module $M_j$, it is understood that there is an amount of overlap in FOVs between the user device $D_i$ and the relevant camera module $M_j$. It is understood that all the user camera devices that are capturing the event are linked with at least one camera module of the virtual reality cameras (e.g., $VR_1$, $VR_2$, ... , $VR_n$).

At operation 220, the method 200 includes creating an event VR content by combining the plurality of VR contents (received from the VR cameras ($VR_1$, $VR_2$, ... $VR_n$)) and the plurality of video contents (received from the user camera devices ($D_1$, $D_2$ ... $D_m$)) based on the linking of the FOVs of the user camera devices with respective FOVs of relevant camera modules of the VR cameras.

The event VR content is created such that while viewing the event VR content, a viewer can navigate seamlessly between the plurality of VR contents via the plurality of video contents. The event VR content can be understood to offer seamless transition from one VR stream (e.g., VR content 1 provided by a VR camera VR1) to another VR stream (e.g., VR content 2 provided by a VR camera VR2) through intermediate views appropriately selected from the plurality of video contents provided by the user camera devices ($D_1$, $D_2$ ... $D_m$).

In a typical representation, all the linked user camera devices and the camera modules of the VR cameras can be considered as a visual connected graph (also referred to as 'connected visual network'), where the viewer of the event VR content can view the content in one or more sequences of nodes of the connected graph. Hence, in an example embodiment, the event VR content is created by forming the connected graph that is based on linking FOVs associated with camera modules of the plurality of VR cameras with the FOVs of the user camera devices. While viewing the event VR content, the user can traverse through any edge of the connected graph for viewing the event VR content that offers a seamless transition between different FOVs. An example representation of the linking of a user camera device with a relevant camera module is shown in FIG. 3 and an example representation of a connected graph (a connected visual network) for creating the event VR content is described with reference to FIG. 4.

Figure 3:
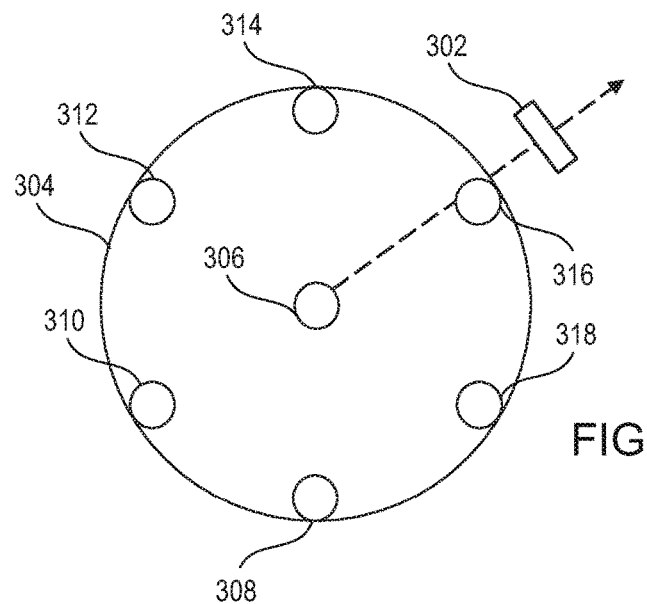
FIG. 3 illustrates an example representation of establishing a link between a user camera device and a camera module of a VR camera for seamless transition of views, in accordance with an example embodiment.

FIG. 3 illustrates an example representation of establishing a link between a user camera device 302 (hereinafter referred to as 'user device 302') and a camera module 306 of a VR camera 304 for seamless transition of views, in accordance with an example embodiment. In the illustrated figure, the VR camera 304 has 8 camera modules 306, 308, 310, 312, 314, 316, 318, and eighth camera module (not shown) for capturing a 360 degree view of a scene. In an implementation, the camera modules of the VR camera 304 are configured and arranged with respect to each other such that the 360 degree view of the surrounding of the VR camera 304 is captured. The camera modules of the VR camera 304 may have overlapping field of views, such that the images (or image frames) captured by the camera modules (306, 308, 310, 312, 314, 316, 318, and eighth camera module) may be used to generate a 360 degree view of the surrounding.

It is understood that each of the camera module of the VR camera 304 has a corresponding FOV associated with the event, and the user device 302 also has a particular orientation of image sensors present in the user device 302 at any given point of time. In an example embodiment, if the FOV of the user device 302 (i.e. FOV of image sensors present in the user device 302) is substantially same as the FOV of the camera module 306, then the user device 302 may be linked with the camera module 306.

In an example embodiment, the linking of the FOV of the user device 302 and the FOV of the camera module 306 is decided, based on at least a threshold degree of similarity between the FOV of the camera module 306 and the FOV of the user device 302. The threshold degree of similarity may be predetermined, for example, it can be set as equal to 80 percent similarity or any other value. The similarity of the FOVs may be determined based on a variety of suitable techniques. For example, in an example embodiment, the degree of similarity is determined by matching an image frame provided by the user device 302 at a time 't' with an image frame captured by the camera module 306 of the virtual reality camera 304 at the same time 't'. The image frames may be matched by matching the pixels of the image frames or any other suitable image processing technique. Alternatively or additionally, degree of similarity may be determined based on comparing an orientation of the user device 302 with that of the camera module 306. For instance, the user device 302 has inertial sensors such as accelerometer, compass, and/or gyroscope for providing the orientation information of the user device 302. In an example embodiment, an apparatus (e.g., the VR content server 508 described with reference to FIG. 5) already has the orientation information of the camera modules of the VR camera 304, and by comparing the orientation information received from the user device 302 and the orientation information of the camera modules of the VR camera 304, the apparatus can determine whether the user device 302 can be linked with the camera module 306 or not. For instance, if the orientations of the user device 302 and that of the camera module 306 are 80 percent similar, it suggests there is 80 percent overlap between the FOV of the camera module 306 and the FOV of the image sensors of the user device 302.

In an example embodiment, the user device 302 may be a dynamic node and user may change the orientation of the user device 302, and in such scenarios, the orientation of the user device 302 may change to display visual content that may not be similar to the views of the camera module 306. In such scenarios, the degree of similarity is computed continuously to determine a new relevant camera module with a high degree of similarity and link the user device 302 with the new relevant camera module. In some example embodiments, as soon as the orientation of image sensors of the user device 302 changes, the apparatus or even the VR camera 304 links the user device 302 with relevant camera module of the VR camera 304. In an example embodiment, the VR camera 304 can also link the relevant camera module of the VR camera 304 with the user device 302, and provide information of the linking to the apparatus for example, the VR content server 508.

Figure 4:
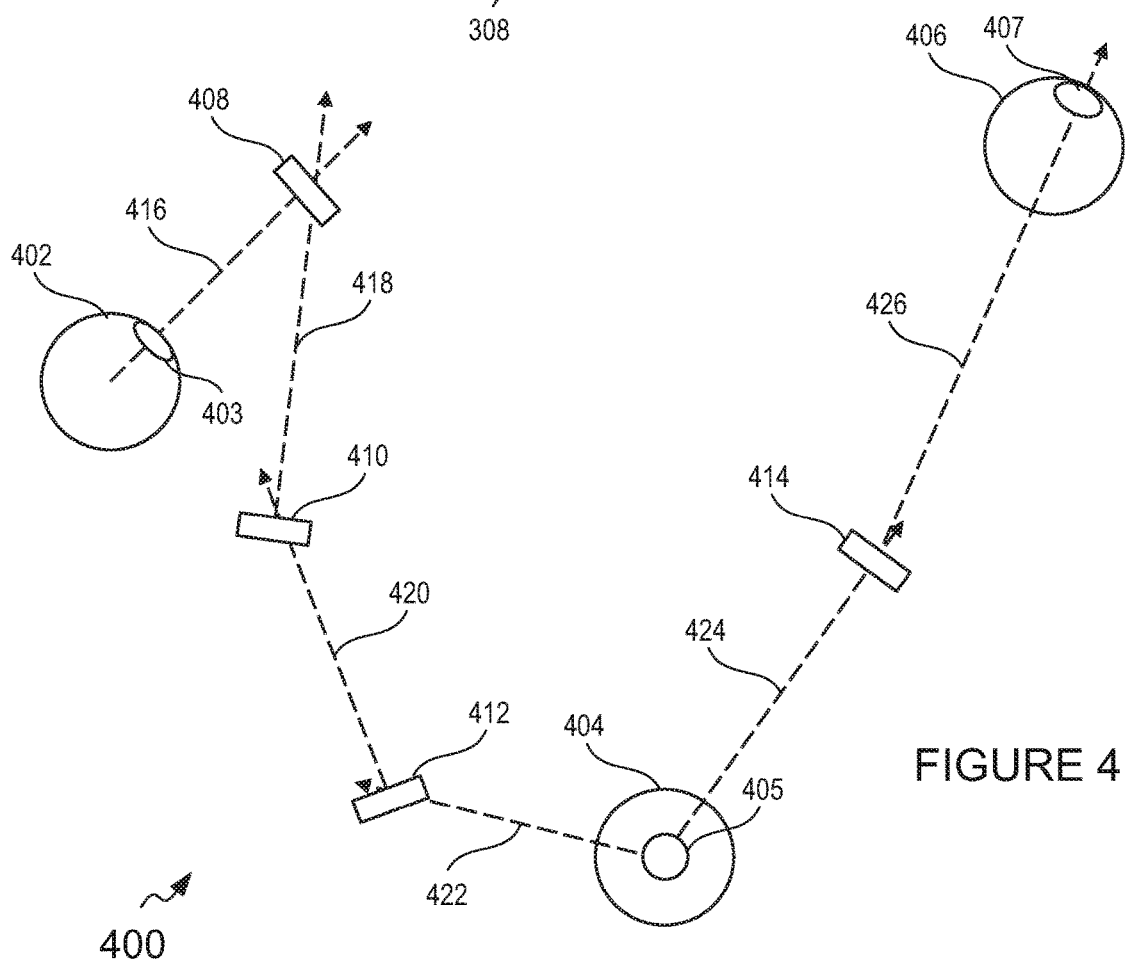
FIG. 4 illustrates an example representation of a connected visual network for seamless transition of views, in accordance with an example embodiment.

Referring now to FIG. 4, an example representation of a connected visual network 400 representing seamless transition of views amongst devices such as VR cameras and user camera devices is shown. In the illustrated FIG. 4, the VR cameras 402, 404 and 406 are fixed nodes of the connected visual network 400, and user camera devices 408, 410, 412, 414 join the connected visual network 400 as dynamic nodes. In various example embodiments, links may be determined between the individual camera modules of the VR cameras 402, 404, 406 and the user camera devices 408, 410, 412, 414 (also interchangeably referred to as 'user device'), and also between any two user devices amongst the user devices 408, 410, 412, 414, and each link forms an edge of the connected visual network 400 (e.g., a graph).

In this example representation, the user device 408 is linked to a camera module 403 of a first VR camera 402. As explained with reference to FIGS. 2 and 3, if the apparatus determines that there is at least a threshold degree of similarity between FOV of the user device 408 and FOV of the camera module 403 of the first VR camera 402, the user device 408 is linked with the relevant camera module 403, and the user device 408 is added as an adjacent node (also referred to as dynamic node) to the node corresponding to the relevant camera module 403. An example of a process for determining the threshold degree of similarity is explained with reference to FIG. 3. It is understood that the linking of the user device 408 with the camera module 403 may change dynamically if the FOV of the user device 408 changes. In an example embodiment, the linking of the devices (e.g., user device 408 and the camera module 403) is performed in real-time depending upon current visual content provided by the devices. In the illustrated FIG. 4, a link 416 forms an edge of the connected visual network 400 between a fixed node (the camera module 403 of the first VR camera 402) and a dynamic node (the user device 408).

In this example representation, the user device 408 establishes a link 418 (also referred to as 'visual link 418') with a user device 410 based on visual similarity between the FOVs of the user device 408 and the user device 410. In an example embodiment, the visual link 418 is established when there is at least a threshold degree of similarity between the FOVs of the user devices 408 and 410. The user device 410 is added as adjacent node to the node representing the user device 408. The user devices 408 and 410 are dynamic nodes of the connected visual network 400 and the visual link 418 forms the edge between dynamic nodes 408 and 410. In this example representation, the user devices 410 and 412 establish a visual link 420 in a similar fashion as described above between the user devices 408 and 410, and the user device 412 is added as adjacent node to the node representing the user device 410. The user devices 410 and 412 form the dynamic nodes of the connected visual network 400.

In this example representation, there is a visual link 422 formed between the user device 412 and a camera module 405 of a second virtual reality camera (e.g., the camera module 404) based on a threshold degree of similarity between FOVs of the camera module 405 and the user device 412. In this example representation, the dynamic nodes (user devices 408, 410 and 412) provide a seamless transition of views from the camera module 403 of the first virtual reality camera 402 to the camera module 405 of the second virtual reality camera 404, as there may be a gradual difference in FOVs if a viewer views the event VR content in a sequence, i.e. the VR content of the camera module 403, video content of the user device 408, video content of the user device 410, video content of the user device 412 and the VR content of the camera module 405.

In this example representation, the camera module 405 is determined as a relevant camera module for the user device 414 based on similarity in FOVs of the user device 414 and the camera module 405. The user device 414 is added as an adjacent dynamic node (see, visual link 424) to the camera module 405 of the virtual reality camera 404. In this example representation, it is also shown that the user device 414 may also be linked (see, visual link 426) to a camera module 407 of the VR camera 406, as the camera module 407 may be determined as relevant camera module for the user device 414. The user device 414 is an adjacent dynamic node of both the camera module 405 and the camera module 407, as there may be at least a threshold degree of similarity between the FOV of the user device 414 and FOV of each of the camera modules 405 and 407. In this example, views of the dynamic node (user device 414) provide a seamless transition in FOV from the camera module 405 of the second virtual reality camera 404 to the camera module 407 of the third virtual reality camera 406, as there may be a gradual difference in FOVs if a viewer views the event VR content in a sequence i.e. the VR content of the camera module 405, video content of the user device 414 and the VR content of the camera module 407.

In an embodiment, the user can traverse through any edge (links 416, 418, 420, 422, 424, 426) of the graph that includes fixed nodes (camera modules 403, 405, 407) and dynamic nodes (user devices 408, 410, 412, 414) to view event VR content with seamless transition between FOVs of camera modules 402, 404, 406 and user devices 408, 410, 412, 414. For example, if a viewer while watching the event VR content, decides to make a transition from a VR steam 1 (e.g., VR content associated with the camera module 403) to a VR stream 2 (e.g., VR content associated with the camera module 405), the viewer is presented with the transition through the intermediate views, for example video contents of the user devices 408, 410 and 412 to ensure a seamless transition of views from the VR stream 1 to the VR stream 2. Similarly, if the viewer while watching the event VR content, decides to make a transition from the VR steam 1 (e.g., VR content associated with the camera module 403) to a VR stream 3 (e.g., VR content associated with the camera module 407), the viewer is presented with the transition through the intermediate views, for example video content of the user devices 408, 410 and 412, the VR content of the camera module 405 and the video content of the user device 414 to ensure a seamless transition of views from the VR stream 1 to the VR stream 3.

In an embodiment, the camera modules of the plurality of virtual reality cameras (402, 404, 406) form fixed nodes of the graph, the plurality of user camera devices (408, 410, 412, 414) form dynamic nodes of the graph, and links (416, 418, 420, 422, 424, 426) established between FOVs of devices (such as the user camera devices, the camera modules) form the edges of the graph. The viewer can traverse through any edge of the graph (also referred as 'connected visual network') to view the event VR content with seamless transition between views captured with different devices. Further, the user camera devices (408, 410, 412, 414) that are dynamic nodes may join and leave the connected network 400, represented by the graph as desired by the users associated with plurality of user camera devices (408, 410, 412, 414). For instance, the graph is continuously updated based on changes in the orientation of the user camera devices (408, 410, 412, 414), and links are re-established. For example, in a use scenario, if the user pans the user camera device to a different FOV at time 't', it creates a mismatch in visual content of the user camera device with the linked camera module (e.g. relevant camera module determined at time 't−1') of the virtual reality camera. Hence, the link that was established between the user device and the virtual reality camera (e.g. relevant camera module determined at time 't−1') is broken, a new link is established at the time 't' between the user camera device and a relevant camera module having similar FOV with the new FOV of the user camera device. In such a manner, the links are updated in real-time enabling a seamless transition between views of two VR streams, between two user camera devices or between any combinations of devices.

Figure 5:
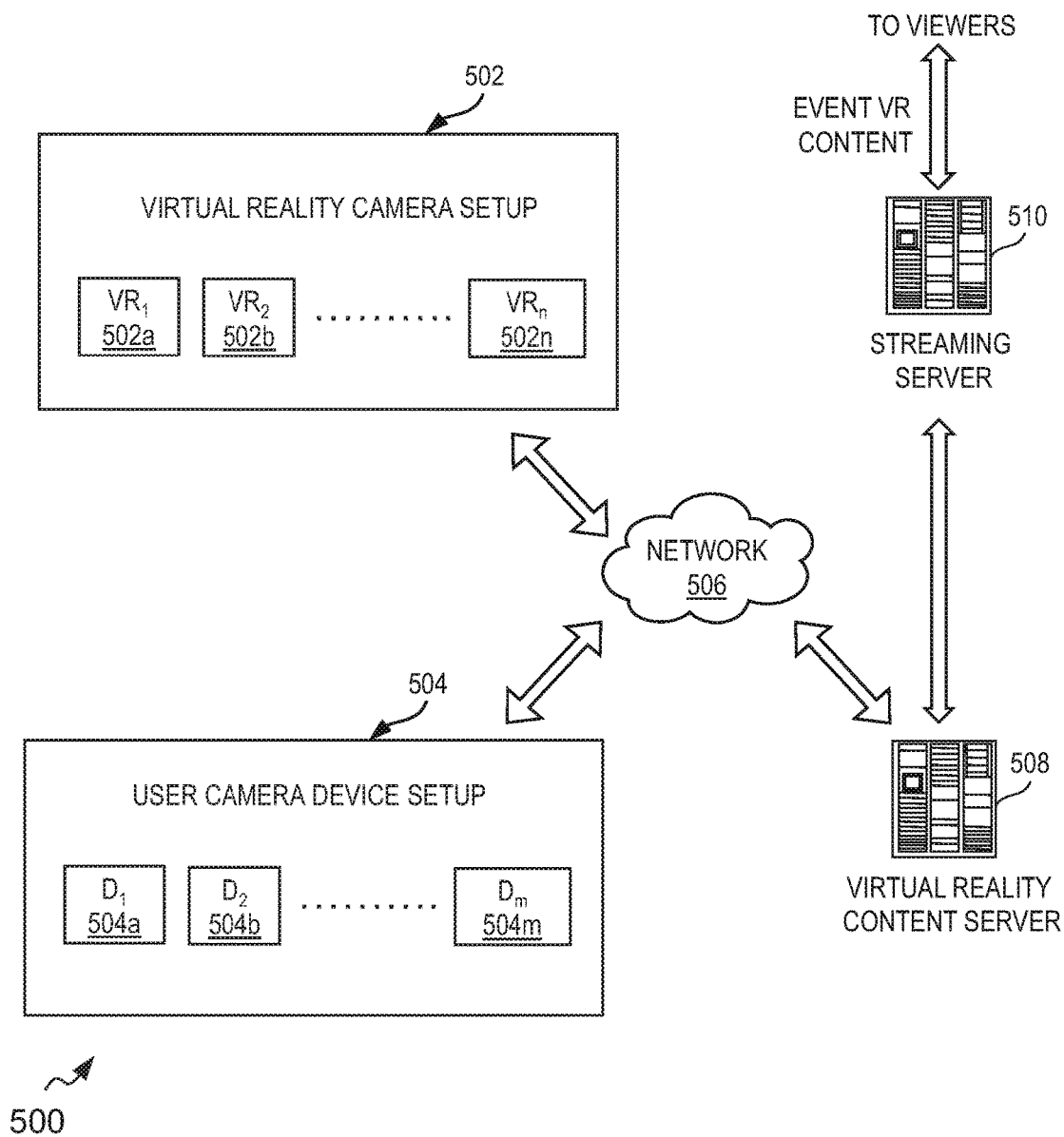
FIG. 5 illustrates a schematic representation of a VR content server for creating event VR content, in accordance with an example embodiment.

Referring now to FIG. 5 an example of a system 500 for providing VR content of an event is illustrated in accordance with an example embodiment. The system 500 includes a virtual reality camera setup 502, a user camera device setup 504, a network 506, a virtual reality content server 508 and a streaming server 510.

The VR camera setup 502 includes one or more VR cameras $VR_1$, $VR_2$, . . . . $VR_n$ (see, 502a, 502b . . . , 502n) mounted at various locations and are configured to capture plurality of VR contents that correspond to different views of the event. For example, four virtual reality cameras may be positioned at appropriate places (e.g., four corners) to ensure coverage of the event from different sides. Each VR camera of the VR camera setup 502 includes multiple camera modules (e.g., $M_1$, $M_2$ . . . , $M_k$) that are positioned with respect to each other such that they have overlapping field of views and a 360 degree 3-D view of the scene surrounding the virtual reality camera can be obtained based on the images/image frames captured individually by the multiple camera modules of the VR camera. For example, the VR camera $VR_1$ may include eight camera modules ($MR_{1-1}$, $MR_{1-2}$ . . . $MR_{1-8}$) with overlapping field of views to obtain 360 degree view around the VR camera $VR_1$. Herein, the VR cameras are explained as being capable of capturing a 360 degree 3-D view of the scene; however it should not be understood as limiting to the scope of example embodiments. As such, embodiments described herein are also applicable on the VR cameras which do not cover the entire 360 degree view (e.g., cover only a view of 270 degree or any other angle). The virtual reality server 508 receives the plurality of VR contents generated by the VR camera setup 502 via a network 506.

The user camera device setup 504 provides a plurality of video contents (e.g., image frames) associated with the event to the VR content server 508 via the network 506. The user camera device setup 504 includes user camera devices $D_1$, $D_2$, . . . , $D_m$ (see, 504a, 504b . . . 504m) belonging to users present in the vicinity of the VR cameras $VR_1$, $VR_2$, . . . . $VR_n$. The user devices $D_1$, $D_2$, . . . , $D_m$ may be any device equipped with a camera module and network connectivity that can capture real-time images, videos of the event and transfer the captured images and videos to the VR content server 508. Examples of the user camera devices $D_1$, $D_2$, . . . , $D_m$ may include, but not limited to, a computer terminal, a smartphone, a laptop, a desktop, an all-in-one computer, a tablet, a netbook, an ultrabook, a personal digital assistant (PDAs), a gaming console, a Chromebook®, a Cloudbook®, a Chromebox®, a mobile phone, a smartphone, an iPhone®, an electronic tech wearable, or a smart TV.

The network 506 may be a centralized network or may comprise a plurality of sub-networks that may offer a direct communication between the entities or may offer indirect communication between the entities. Examples of the network 506 include wireless networks, wired networks, and combinations thereof. Some non-exhaustive examples of the wireless networks may include wireless local area networks (WLANs), Bluetooth or Zigbee networks, Virtual Private Network (VPN), cellular networks, any overlay network and the like. Some non-exhaustive examples of wired networks may include Local Area Networks (LANs), Ethernet, Fiber Optic networks, Virtual Private Network (VPN), any overlay network and the like. An example of a combination of wired networks and wireless networks may include the Internet.

In some example embodiments, the VR content server 508 may include one or more processing elements (e.g., computing systems, databases, etc.) to process visual contents (e.g., VR contents and video contents) received from the VR camera setup 502 and the user camera device setup 504 to perform image processing operations and to create the event VR content. For instance, the VR content server 508 includes processing elements such as at least one processor, at least one memory and communication interfaces to perform communication with the VR camera setup 502 and the user camera device setup 504 via the network 506. An example embodiment of the VR content server 508 is also explained with reference to FIG. 8.

In an example embodiment, at least one processor is configured to along with contents of at least one memory of the VR content server 508 to cause the VR content server 508 receive the VR contents from the VR cameras $VR_1$-$VR_n$ and the video contents from the user camera devices $D_1$-$D_m$.

The VR content server 508 is caused to link the views (e.g., FOVs) of the user devices $D_1$-$D_m$ with relevant camera modules of the VR cameras $VR_1$-$VR_n$. Some embodiments of linking views of the user camera devices $D_1$-$D_m$ with the relevant camera modules ($M_1$, $M_2$ . . . , $M_k$) have been explained with respect to FIGS. 3 and 4. For instance, at a given time instant 't', if there is at least a threshold degree of similarity between the visual content captured by a given user device $D_i$ and a visual content captured by a given camera module $M_i$, the camera module $M_i$ is determined as the relevant camera module and the user device $D_i$ can be linked with the camera module $M_i$. Additionally or alternatively, by comparing the orientation of the user device $D_i$ and known orientation of the camera module $M_i$, it may be checked if there is at least threshold degree of similarity between FOVs of the user device $D_i$ and the camera module $M_i$.

The VR content server 508 is caused to create a visual connected graph (as described with reference to FIG. 4). It is to be understood that the visual connected graph (also referred to as 'visual connected network') indicates a combination of the VR contents captured by camera modules of the VR cameras and the video contents captured by user camera devices based on edges and nodes of the visual connected graph, that can be accessed by the viewers in one or more sequences of nodes of the connected graph.

In some example embodiments, the streaming server 510 maintains an infrastructure for broadcasting application. The streaming server 510 interacts with the VR content server 508 for receiving the event VR content and providing the event VR content to viewers. In an example embodiment, the streaming server 510 may perform a real-time streaming of the event, or may perform a time delayed streaming. It is understood that the functionalities of the streaming server 510 can also be embodied in form of cloud services and/or subscription services. In some example embodiments, the event VR content is created and stored in a database (not shown) embodied in or otherwise accessible to the VR content server 508, and the streaming server 510 may provide the event VR content based on a viewer's request.

In an example embodiment, the user devices $D_1$-$D_m$ are registered with the VR server 508. In an example embodiment, whenever a new user device ($D_i$) is detected in the area of the event, the user device $D_i$ may be prompted with a request to contribute to the event recordings. For example, a pop up window may be prompted on the user device $D_i$ displaying a request message to join the connected visual network. In an example embodiment, a user associated with a user camera device may be required to enter credentials for identifying the user in the connected visual network. In an embodiment, the credentials of the plurality of users associated with user camera devices $D_1$-$D_m$ may be stored in the database embodied in or accessible to the VR content server 508. Examples of the credentials may include profile of user, details of the user camera device, and bank account details of the user. In some example embodiments, the user may pre-register for contribution to the event data by appropriate means such as by subscribing to content contributing service for the event, by signing up for an event application associated with the ongoing event, by invoking an installed application associated with the event on the user device, and the like. In an alternate or additional embodiment, a user device may communicate with a nearest VR camera of the VR camera setup 502 instead of the VR content server 508 for completing the registration process. In such embodiment, the nearest VR camera provides the information of the new user device to the VR content server 508.

In an example embodiment, the plurality of users associated with user camera devices $D_1$-$D_m$ contributing to the event VR content may be incentivized based on their contribution of video contents for creating the event VR content. For instance, the VR content server 508 may be configured to provide a fixed fee to a user providing video content to the VR content server 508. Alternatively, the VR content server 508 may be configured to calculate a time duration for which the video content provided by a given user camera device $D_i$ is accessed by all viewers of the event VR content. The user associated with the user camera device $D_i$ may be incentivized based on the calculated time duration. In an example embodiment, the VR server 508 may be configured to calculate the incentive (e.g., cost) based on predetermined fee structure. Alternatively or additionally, the user may be given option to advertise a business associated with the user for a time duration during streaming that corresponds to the duration for which the user contributed to the event VR content.

Figure 6:
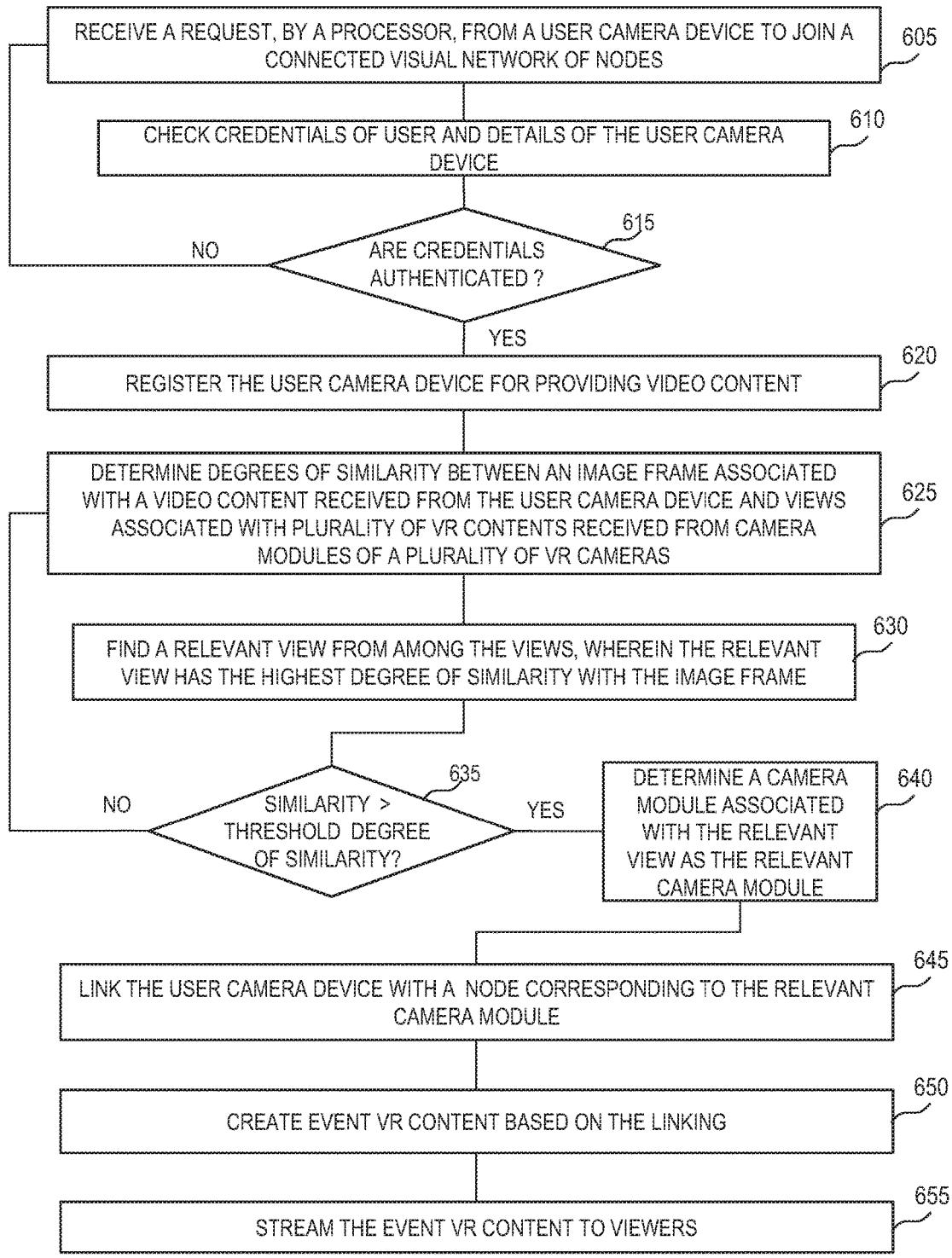
FIG. 6 is a flowchart depicting an example method for providing event VR content, in accordance with another example embodiment.

FIG. 6 illustrates a flow diagram of an example method of providing event VR content, in accordance with an example embodiment.

At 605, the method 600 includes receiving a request, by a processor, from a user camera device $D_i$ to join a connected visual network of nodes, where a plurality of VR cameras are already connected as nodes. In an example embodiment, the processor is embodied in a VR content server such as a VR content server 508 (see, FIG. 5). The user's request may be received in form of a request made on an application related to the event, where the application may be pre-installed on the user camera device, or may be accessed by the user camera device on a website, portal, or any link available on intranet, LAN, the Internet.

In an optional embodiment, at 610, the method 600 includes checking credentials of the user and the details of the user camera device. Some examples of checking the credentials of the user may include authenticating a pin or password provided by the user device, or performing any biometric authentication. At 610, details of the user camera device are also checked, for example, the system details of the user camera device. Some examples of the system details include but not limited to, resolution of the images sensors present in the user camera device, frame capture rate, memory size present in the user camera device, and presence of communication module in the user camera device.

At 615, the method 600 checks whether credentials are authenticated. If the credentials are authenticated, the method 600 proceeds to 620 where the user camera device is registered for providing video content, otherwise the method 600 goes back to 605, or the method 600 may terminate.

At 625, the method 600 includes matching an image frame provided by the user camera device $D_i$ with at least one image frame of a camera module amongst image frames associated with VR content provided by camera modules of a plurality of VR cameras. In an example embodiment, the method 600 includes determining degrees of similarity between an image frame associated with a video content received from the user camera device $D_i$ and views associated with plurality of VR contents received from camera modules of a plurality of VR cameras. At 630, the method 600 includes finding a relevant view from among the views, wherein the relevant view has the highest degree of similarity with the image frame.

At 635, it is checked if the degree of similarity between the image frame provided by the user camera device $D_i$ and the relevant view (e.g., associated with a camera module $M_i$) is greater than a threshold degree of similarity. In an example embodiment, value of the threshold may be a pre-defined value based on metrics associated with FOV of the virtual reality cameras. In an example embodiment, pixel matching between the image frames may be performed by suitable image processing techniques to determine the degree of similarity. If the degree of similarity is greater than the threshold degree of similarity, at 640 the method 600 includes determining the camera module $M_i$ associated with the relevant view as the relevant camera module for the user camera device $D_i$.

At 645, the method 600 includes linking the user device $D_i$ with the camera module $M_i$ and the user device $D_i$ is added as a dynamic node adjacent to a node associated with the camera module $M_i$ in the connected visual network.

The method 600 further checks if there is a change in the orientation of the user device $D_i$. If there is a change in the orientation of the user device $D_i$, the method 600 again proceeds to operation 625.

At 650, the method 600 includes creating event VR content based at least on the linking of the user device $D_i$ with the relevant camera module $M_i$. It is noted that all user devices that come into the area of the event are linked with corresponding relevant camera modules.

At 655, the method 600 includes sending the event VR content (e.g., streaming) to viewers for viewing the event VR content. The viewers can traverse through the one or more sequences of nodes in the connected visual network for a seamless view of the event.

Figure 7:
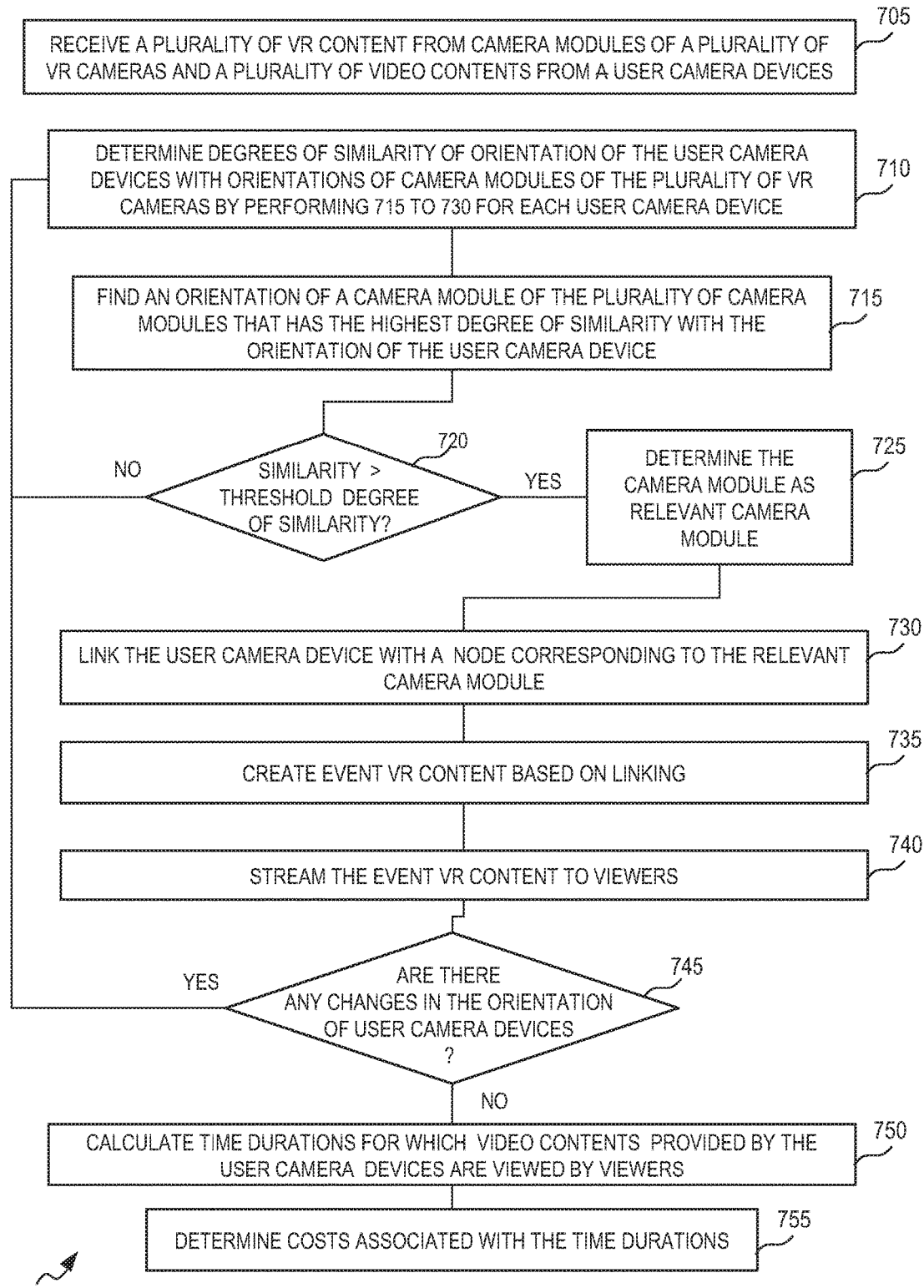
FIG. 7 is a flowchart depicting an example method for providing event VR content, in accordance with another example embodiment.

FIG. 7 illustrates an example method of providing event VR content, in accordance with another example embodiment.

At 705, the method 700 includes receiving a plurality of VR content from camera modules of a plurality of VR cameras and a plurality of video contents from user camera devices. It is considered that the user camera devices are registered for contributing to the recording of the event. If the user camera devices are not registered, they may be registered as explained with reference to FIG. 6.

At 710, the method 700 includes determining degrees of similarity of orientation of the user camera devices (for example, a user camera device $D_i$) with orientations of camera modules of the plurality of VR cameras. In an example embodiment, the orientations of the camera modules are already known and the orientation of the device $D_i$ is provided by means such as accelerometer, compass present in the device $D_i$.

At 715, the method 700 includes finding an orientation of a camera module (e.g., a camera module $M_i$) of the plurality of camera modules that has the highest degree of similarity with the orientation of the user camera device.

At 720, it is checked if the degree of similarity between the orientation of the device $D_i$ and the camera module $M_i$ is greater than a threshold degree of similarity. In an example embodiment, value of the threshold may be a pre-defined value based on metrics associated with FOV of the virtual reality cameras. If the degree of similarity is greater than the threshold degree of similarity, at 725 the method 700 includes determining the camera module $M_i$ as the relevant camera module for the user camera device $D_i$.

At 730, the method 700 includes linking the user device $D_i$ with the camera module $M_i$ and the user device $D_i$ is added as a dynamic intermediate node adjacent to a node associated with the camera module $M_i$ in the connected visual network.

It is understood that the operations 705 to 730 are performed for each user camera device that is interested in providing video content, and each user camera device is added to the connected visual network. Accordingly, the method 700 includes updating the graph (also referred to as 'connected visual network') with the plurality of virtual reality cameras as fixed nodes, the plurality of user devices as dynamic intermediate nodes and the placement of the user camera devices as intermediate nodes in the graph are determined based on the orientations of the user camera devices. The connected graph represents the connected visual network. In an embodiment, the plurality of user devices are placed as dynamic intermediate nodes in the connected graph based on the orientation of the plurality of user devices. The link indicates an overlap between FOV associated with the user device and FOV associated with the camera module of the virtual reality camera. The link forms an edge of the connected graph between a dynamic intermediate node (user device) and the fixed node (virtual reality camera associated with the camera module). In an embodiment, the plurality of user devices are dynamic intermediate nodes as they can join or leave the connected visual network as desired. The linking of user device based on orientation is explained with reference to FIG. 3 and an example of constructing the visual connected graph is described with reference to FIG. 4.

At 735, the method 700 includes creating the VR content based at least on the linking of the user device $D_i$ with the relevant camera module $M_i$. It is noted that all user devices that come into the area of the event are linked with corresponding relevant camera modules.

At 740, the method 700 includes sending the event VR content (e.g., streaming) to viewers for viewing the event VR content. The viewers can traverse through one or more sequences of nodes in the visual connected graph for a seamless view of the event.

At 745, it is checked if there is a change in the orientation of the user device $D_i$. If there is a change in the orientation of the user camera device $D_i$, the method 700 again proceeds to operation 710.

At 750, the method 700 includes calculating a time duration for which a video content received from the user camera device $D_i$ is present in the event VR content. Alternatively, a time duration is calculated for which the video content provided by the user camera device $D_i$ is viewed by the viewers. At 755, the method 700 includes determining a cost associated with the time duration. It should be understood that the operations 745 and 750 are performed for all user camera devices.

It should be noted that to facilitate discussions of the flowcharts of FIGS. 2, 6 and 7 certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 200, 600 and 700 are performed in an automated fashion. These operations involve substantially no interaction with the user. Other operations of the methods 200, 600 and 700 may be performed by in a manual fashion or semi-automatic fashion. These operations involve interaction with the user via one or more user interface presentations.

The methods depicted in these flowcharts may be executed by, for example, the VR content server 508 of FIG. 5 or apparatus 800 described with reference to FIG. 8. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 800 (or the VR content server 508). However, the operations of the methods can be described and/or practiced by using any other apparatus.

Figure 8:
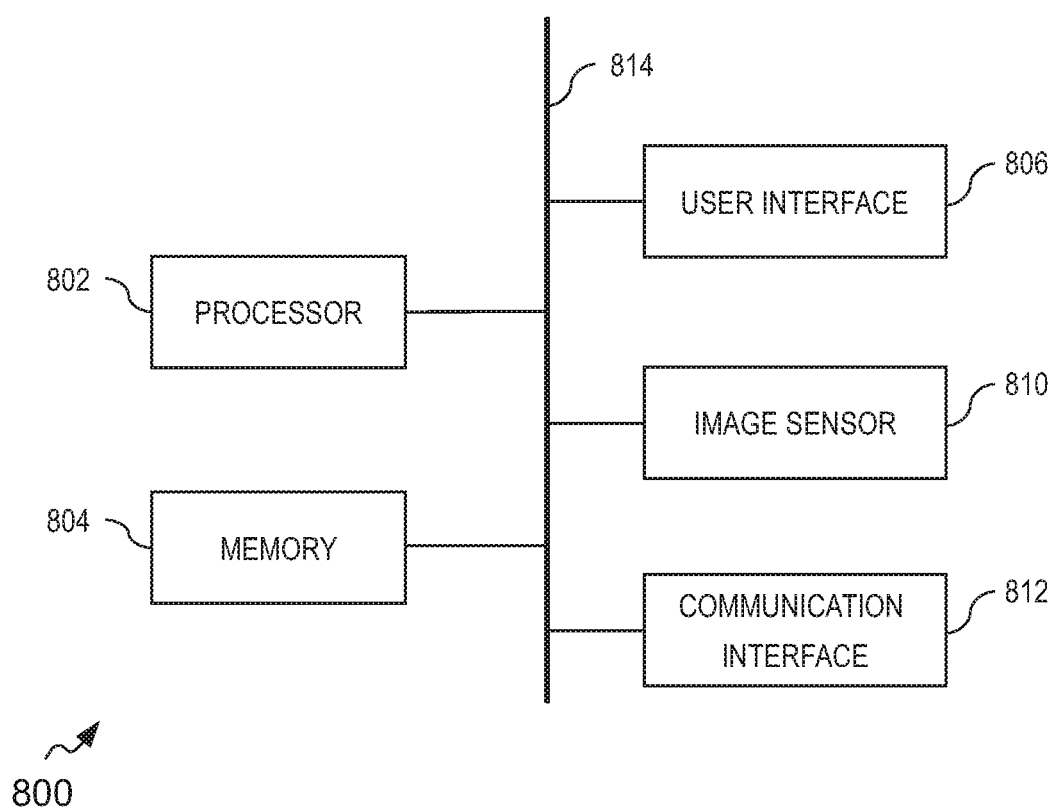
FIG. 8 illustrates an apparatus for providing event VR content to viewers, in accordance with an example embodiment.

FIG. 8 illustrates an apparatus 800 for providing event VR content to viewers, in accordance with some example embodiments. In an embodiment, the apparatus 800 may be employed, for example, in one or more devices such as the virtual reality content server 508 of FIG. 5. However, it should be noted that the apparatus 800, may also be employed on a variety of other devices both mobile and fixed, and therefore, embodiments should not be limited to application on devices such as the virtual reality content server 508 of FIG. 5. In an example embodiment, the apparatus 800 may be embodied in form of one or more servers that are connected to each other, and where each server performs computational operations and image processing operations for the virtual reality content and the video content received from virtual reality cameras and plurality of user devices, respectively. Alternatively, embodiments may be employed on a combination of devices including, for example, those listed above. Accordingly, various embodiments may be embodied wholly at a single device, or in a combination of devices. Furthermore, it should be noted that the devices or elements described below may not be mandatory and thus some may be omitted in certain embodiments.

The apparatus 800 includes or otherwise is in communication with at least one processor 802 and at least one memory 804. Examples of the at least one memory 804 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, phase-change memory and the like. The memory 804 may be configured to store information, data, applications, instructions or the like for enabling the apparatus 800 to carry out various functions in accordance with various example embodiments. For example, the memory 804 may be configured to store image processing instructions and other instructions for determining the user inputs, processing of the VR content and generation of the media file, by the processor 802.

Figure 9:
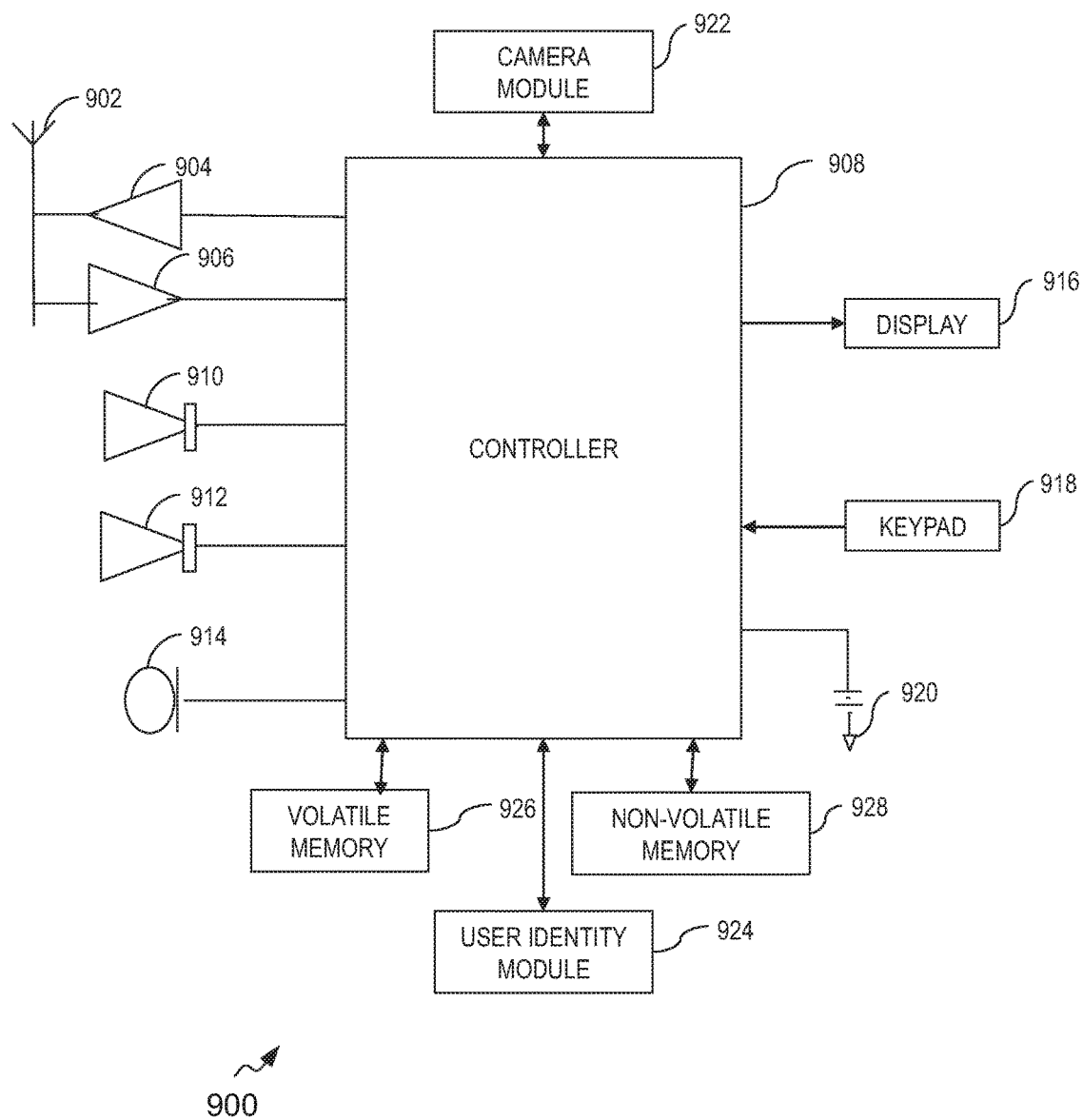
FIG. 9 illustrates a device for providing event VR content to viewers, in accordance with another example embodiment.

An example of the processor 802 may include a controller 908 (see FIG. 9). The processor 802 may be embodied in a number of different ways. The processor 802 may be embodied as a multi-core processor, a single core processor; or combination of multi-core processors and single core processors. For example, the processor 802 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 804 or otherwise accessible to the processor 802. Alternatively or additionally, the processor 802 may be configured to execute hard coded functionality. As such, whether configured by hardware or software methods, or by a combination thereof, the processor 802 may represent an entity, for example, physically embodied in circuitry, capable of performing operations according to various embodiments while configured accordingly. For example, if the processor 802 is embodied as two or more of an ASIC, FPGA or the like, the processor 802 may be specifically configured hardware for conducting the operations described herein. Alternatively, as another example, if the processor 802 is embodied as an executor of software instructions, the instructions may specifically configure the processor 802 to perform the algorithms and/or operations described herein when the instructions are executed. However, in some cases, the processor 802 may be a processor of a specific device, for example, a mobile terminal or network device adapted for employing embodiments by further configuration of the processor 802 by instructions for performing the algorithms and/or operations described herein. The processor 802 may include, among other things, a clock, an arithmetic logic unit (ALU) and logic gates configured to support operation of the processor 802.

A user interface 806 may be in communication with the processor 802. Examples of the user interface 806 include, but are not limited to, an input interface and/or an output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 806 may include, among other devices or elements, any or all of a speaker, a microphone, a display, and a keyboard, touch screen, or the like. In this regard, for example, the processor 802 may comprise user interface circuitry configured to control at least some functions of one or more elements of the user interface 806, such as, for example, a speaker, ringer, microphone, display, and/or the like. The processor 802 and/or user interface circuitry comprising the processor 802 may be configured to control one or more functions of one or more elements of the user interface 806 through computer program instructions, for example, software and/or firmware, stored on a memory, for example, the at least one memory 804, and/or the like, accessible to the processor 802.

In an example embodiment, the apparatus 800 may include an electronic device. Some examples of the electronic device include a communication device, a VR content playback system, a media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 806, having user interface circuitry and user interface software configured to facilitate a user to control at least one function of the electronic device through use of a display and further configured to respond to user inputs. In an example embodiment, the electronic device may include a display circuitry configured to display at least a portion of the user interface 806 of the electronic device. The display and display circuitry may be configured to facilitate the user to control at least one function of the electronic device.

In an example embodiment, the apparatus 800 may include image sensors 810. The sensor 810 may be an image capturing device. The apparatus 800 may also include communication interface 812 to receive the plurality of VR content and the plurality of video content from the VR cameras and the user camera device, respectively, via a network such as the network 506.

These components (802-812) may communicate to each other via a centralized circuit system 814 to facilitate creating event VR content associated with an event. The centralized circuit system 814 may be various devices configured to, among other things, provide or enable communication between the components (802-812) of the apparatus 800. In certain embodiments, the centralized circuit system 814 may be a central printed circuit board (PCB) such as a motherboard, a main board, a system board, or a logic board. The centralized circuit system 814 may also, or alternatively, include other printed circuit assemblies (PCAs) or communication channel media.

In an example embodiment, the apparatus 800 is caused, by the processor 802 along with the content of memory 804 and other components of the apparatus 800, to perform the functions described in FIGS. 1 to 7. For instance, the apparatus 800 is caused to facilitate receipt of the plurality of VR contents associated with the event from the camera modules of the plurality of VR cameras, to facilitate receipt of the plurality of video contents associated with the event from the plurality of user camera devices. As described with reference to FIGS. 1 to 7, the apparatus 800 is further caused to link the FOVs of the plurality of user camera devices with relevant camera modules, and to create the event VR content by combining the plurality of VR contents and the plurality of video contents based on the linking of the FOVs.

FIG. 9 illustrates a device 900, in accordance with an example embodiment. It should be understood, however, that the device 900 as illustrated and hereinafter described is merely illustrative of one type of device that may benefit from various embodiments, therefore, should not be taken to limit the scope of the embodiments. The device 900 can be embodied as the apparatus 800, or be embodied in the VR content server 508, or can be examples of the apparatus 800 and/or the VR content server 508. As such, it should be appreciated that at least some of the components described below in connection with the device 900 may be optional and thus in an example embodiment may include more, less or different components than those described in connection with the example embodiment of FIG. 9. The device 900 could be any of a number of types of touch screen based mobile electronic devices, for example, a VR content playback system, portable digital assistants (PDAs), mobile televisions, gaming devices, cellular phones, all types of computers (for example, laptops, mobile computers or desktops), cameras, mobile digital assistants, or any combination of the aforementioned, and other types of communications devices.

The device 900 may include an antenna 902 (or multiple antennas) in operable communication with a transmitter 904 and a receiver 906. The device 900 may further include an apparatus, such as a controller 908 or other processing devices that provides signals to and receives signals from the transmitter 904 and the receiver 906, respectively. The signals may include signaling information in accordance with the air interface standard of the applicable cellular system, and/or may also include data corresponding to user speech, received data and/or user generated data. In this regard, the device 900 may be capable of operating with one or more air interface standards, communication protocols, modulation types, and access types. By way of illustration, the device 900 may be capable of operating in accordance with any of a number of first, second, third and/or fourth-generation communication protocols or the like. For example, the device 900 may be capable of operating in accordance with second-generation (2G) wireless communication protocols such as IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 900 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 908 may include circuitry implementing, among others, audio and logic functions of the device 900. For example, the controller 908 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 900 are allocated between these devices according to their respective capabilities. The controller 908 thus may also include the functionality to convolutionally encode and interleave message and data prior to modulation and transmission. The controller 908 may additionally include an internal voice coder, and may include an internal data modem. Further, the controller 908 may include functionality to operate one or more software programs, which may be stored in a memory. For example, the controller 908 may be capable of operating a connectivity program, such as a conventional web browser. The connectivity program may then allow the device 900 to transmit and receive web content, such as location-based content and/or other web page content, according to a Wireless Application Protocol (WAP), Hypertext Transfer Protocol (HTTP) and/or the like. In an example embodiment, the controller 908 may be embodied as a multi-core processor such as a dual or quad core processor. However, any number of processors may be included in the controller 908.

The device 900 may also comprise a user interface including an output device such as a ringer 910, an earphone or speaker 912, a microphone 914, a display 916, and a user input interface, which may be coupled to the controller 908. The user input interface, which allows the device 900 to receive data, may include any of a number of devices allowing the device 900 to receive data, such as a keypad 918, a touch display, a microphone or other input devices. In embodiments including the keypad 918, the keypad 918 may include numeric (0-9) and related keys (#, *), and other hard and soft keys used for operating the device 900. Alternatively or additionally, the keypad 918 may include a conventional QWERTY keypad arrangement. The keypad 918 may also include various soft keys with associated functions. In addition, or alternatively, the device 900 may include an interface device such as a joystick or other user input interface. The device 900 further includes a battery 920, such as a vibrating battery pack, for powering various circuits that are used to operate the device 900, as well as optionally providing mechanical vibration as a detectable output.

In an example embodiment, the device 900 includes a media capturing element, such as a camera, video and/or audio module, in communication with the controller 908. The media capturing element may be any means for capturing an image, video and/or audio for storage, display or transmission. In an example embodiment in which the media capturing element is a camera module 922, the camera module 922 may include a digital camera capable of forming a digital image file from a captured image. As such, the camera module 922 includes all hardware, such as a lens or other optical component(s), and software for creating a digital image file from a captured image. Alternatively, the camera module 922 may include the hardware needed to view an image, while a memory device of the device 900 stores instructions for execution by the controller 908 in the form of software to create a digital image file from a captured image. In an example embodiment, the camera module 922 may further include a processing element such as a co-processor, which assists the controller 908 in processing image data and an encoder and/or a decoder for compressing and/or decompressing image data. The encoder and/or the decoder may encode and/or decode according to a JPEG standard format or another like format. For video, the encoder and/or the decoder may employ any of a plurality of standard formats such as, for example, standards associated with H.261, H.262/MPEG-2, H.263, H.264, H.264/MPEG-4, MPEG-4, and the like. In some cases, the camera module 922 may provide live image data to the display 916. Moreover, in an example embodiment, the display 916 may be located on one side of the device 900 and the camera module 922 may include a lens positioned on the opposite side of the device 900 with respect to the display 916 to enable the camera module 922 to capture images on one side of the device 900 and present a view of such images to the user positioned on the other side of the device 900.

The device 900 may further include a user identity module (UIM) 924. The UIM 924 may be a memory device having a processor built in. The UIM 924 may include, for example, a subscriber identity module (SIM), a universal integrated circuit card (UICC), a universal subscriber identity module (USIM), a removable user identity module (R-UIM), or any other smart card. The UIM 924 typically stores information elements related to a mobile subscriber. In addition to the UIM 924, the device 900 may be equipped with memory. For example, the device 900 may include a volatile memory 926, such as volatile random access memory (RAM) including a cache area for the temporary storage of data. The device 900 may also include other non-volatile memory 928, which may be embedded and/or may be removable. The non-volatile memory 928 may additionally or alternatively comprise an electrically erasable programmable read only memory (EEPROM), flash memory, hard drive, or the like. The memories may store any number of pieces of information, and data, used by the device 900 to implement the functions of the device 900.

The embodiments illustrated and described herein as well as embodiments not specifically described herein but within the scope of embodiments of the disclosure constitute example apparatus means for creating a viewable content on an interactive display. For example, the elements illustrated and described with reference to FIGS. 5 and 8, when configured, under control of the processor such as the processor 802 and program code in the memory 804 to perform the operations illustrated and described with reference to FIGS. 1 to 9, constitute an exemplary means (e.g., processing means) for facilitating receipt of a plurality of virtual reality (VR) contents associated with an event by a processor, where the plurality of VR contents captured by a plurality of VR cameras, each of the plurality of VR cameras comprising a plurality of camera modules with respective field of views (FOVs) associated with the event. Further, exemplary means are constituted for facilitating receipt of a plurality of video contents associated with the event by the processor, where the plurality of video contents captured by a plurality of user camera devices. Further, exemplary means (e.g., processing means) are constituted for linking FOVs of the plurality of user camera devices with FOVs of relevant camera modules of the plurality of VR cameras, where a FOV of a user camera device of the plurality of user camera devices is linked with a FOV of a relevant camera module of the plurality of VR cameras based on at least a threshold degree of similarity between the FOV of the user camera device and the FOV of the relevant camera module. Furthermore, exemplary means (e.g., processing means) are constituted for creating an event VR content by combining the plurality of VR contents and the plurality of video contents based on the linking of the FOVs of the plurality of user camera devices with FOVs of the relevant camera modules of the plurality of VR cameras.

Without in any way limiting the scope, interpretation, or application of the claims appearing below, a technical effect of one or more of the example embodiments disclosed herein is to create an event virtual reality content of an event. Various example embodiments provision for seamless transition of views between different streams of VR content provided by VR cameras mounted at different locations to capture the event. The seamless transition of views is enabled by means of video content obtained from a plurality of user camera devices. The users associated with the plurality of user camera devices contribute to the connected visual network thereby eliminating jitter that appears during transition between different streams of VR content associated with different views of camera modules of the plurality of virtual reality cameras. Various example embodiments provision for a crowd sourced visual network where the user is incentivized for contributing to the connected visual network. The incentive may be in form of permits to advertise a business associated with the user for a time duration based on the user's contribution to the event virtual reality content associated with the event. Further, constructing a visual connected graph representing a connected visual network for transition of views between camera modules of virtual reality cameras and the plurality of user camera devices provides viewers with a seamless event VR content as the viewers traverse through a sequence of nodes in the visual connected graph. As the visual connected graph is continuously updated based on the degree of similarity, user camera devices can choose to leave or join the connected visual network as desired by the user. Further, the construction of a graph that displays links between various user devices and the virtual reality cameras enable the viewers to traverse along any edge of the graph to view event virtual reality content associated with the event seamlessly.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 5, 8 and/or 9. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
facilitating receipt of a plurality of virtual reality (VR) contents associated with an event by a processor, the plurality of VR contents being captured by a plurality of VR cameras, each of the plurality of VR cameras comprising a plurality of camera modules with respective field of (FOVs) associated with the event;
facilitating receipt of a plurality of video contents associated with the event by the processor, the plurality of video contents being captured by a plurality of user camera devices;
linking FOVs of the plurality of user camera devices with FOVs of relevant camera modules of the plurality of VR cameras by the processor, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and
creating an event VR content by combining the plurality of VR contents and the plurality of video contents based on the linking of the FOVs of the plurality of user camera devices with FOVs of the relevant camera modules of the plurality of VR cameras.

2. The method as claimed in claim 1, further comprising performing a registration of the plurality of user camera devices with the processor for enabling the plurality of user camera devices to provide the plurality of video contents to the processor.

3. The method as claimed in claim 2, wherein performing the registration comprises:
authenticating credentials of users;
authenticating the plurality of user camera devices; and
electronically storing details of the plurality of user camera devices.

4. The method as claimed in claim 1, wherein the linking comprises:
determining degrees of similarity between an image frame associated with a video content received from the user camera device and views associated with the plurality of VR contents; and
determining a camera module, having highest degrees of similarity, as a relevant camera module if the degrees of similarity between the image frame and view of the camera module is more than a threshold degree of similarity.

5. The method as claimed in claim 1, wherein the linking comprises:
determining degrees of similarity between an orientation of the user camera device and orientations of camera modules of the plurality of VR cameras; and
determining a camera module, having highest degrees of similarity, as the relevant camera module, if the degrees of similarity between the orientation of the user camera device and an orientation of the camera module is more than a threshold degree.

6. The method as claimed in claim 1, wherein the linking comprises: forming a connected visual network, where each camera module of the plurality of VR cameras is a node of the connected visual network and the user camera device is added as an adjacent node to the node represented by the relevant camera module associated with the user camera device.

7. The method as claimed in claim 6, wherein creating the event VR content comprising: combining the plurality of VR contents and the plurality of video contents based on one or more sequences of nodes of the connected visual network.

8. The method as claimed in claim 1, further comprising streaming the event VR content.

9. An apparatus comprising:
at least one processor;
a plurality of virtual reality (VR) cameras electrically coupled with the at least one processor; and
at least one memory comprising computer program code, the at least one memory and the computer program code configured to, with the at least one processor, cause the apparatus to at least perform:
facilitate receipt of a plurality of VR contents associated with an event, the plurality of VR contents is captured by a plurality of VR cameras, each of the plurality of VR cameras comprising a plurality of camera modules with respective field of views (FOVs) associated with the event;
facilitate receipt of a plurality of video contents associated with the event, the plurality of video contents is captured by a plurality of user camera devices;
link FOVs of the plurality of user camera devices with FOVs of relevant camera modules of the plurality of VR cameras, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and
create an event VR content by combining the plurality of VR contents and the plurality of video contents based on the linking of the FOVs of the plurality of user camera devices with FOVs of the relevant camera modules of the plurality of VR cameras.

10. The apparatus as claimed in claim 9, wherein the apparatus is further caused, at least in part to perform a registration of the plurality of user camera devices with the at least one processor for enabling the plurality of user camera devices to provide the plurality of video contents.

11. The apparatus as claimed in claim 10, wherein for performing the registration, the apparatus is further caused, at least in part to:
authenticate credentials of users;
authenticate the plurality of user camera devices; and
electronically store details of the plurality of user camera devices.

12. The apparatus as claimed in claim 9, wherein to link the FOV of the user camera device with the FOV of the relevant camera module, the apparatus is further caused, at least in part to:
determine degrees of similarity between an image frame associated with a video content received from the user camera device and views associated with the plurality of VR contents; and
determine a camera module, having highest degrees of similarity, as a relevant camera module if the similarity between the image frame and view of the camera module is more than a threshold degree of similarity.

13. The apparatus as claimed in claim 9, wherein for linking the FOV of the user camera device with the FOV of the relevant camera module, the apparatus is further caused, at least in part to:
determine degrees of similarity between an orientation of the user camera device and orientations of camera modules of the plurality of VR cameras; and
determine a camera module, having highest degrees of similarity, as the relevant camera module, if the degrees of similarity between the orientation of the user camera device and an orientation of the camera module is more than a threshold degree.

14. The apparatus as claimed in claim 9, wherein for linking the FOVs, the apparatus is further caused, at least in part to form a connected visual network, where each camera module of the plurality of VR cameras is a node of the connected visual network and the user camera device is added as an adjacent node to the node represented by the relevant camera module associated with the user camera device.

15. The apparatus as claimed in claim 14, wherein for creating the event VR content, the apparatus is further caused, at least in part to combine the plurality of VR contents and the plurality of video contents based on one or more sequences of nodes of the connected visual network.

16. The apparatus as claimed in claim 9, wherein the apparatus is further caused, at least in part to stream the event VR content.

17. A computer program product comprising at least one computer-readable storage medium, the computer-readable storage medium comprising a set of instructions, which, when executed by at least one processor, cause an apparatus to at least perform:
facilitate receipt of a plurality of virtual reality (VR) contents associated with an event, the plurality of VR contents being captured by a plurality of VR cameras, each of the plurality of VR cameras comprising a plurality of camera modules with respective field of views (FOVs) associated with the event;
facilitate receipt of a plurality of video contents associated with the event, the plurality of video contents being captured by a plurality of user camera devices;
link FOVs of the plurality of user camera devices with FOVs of relevant camera modules of the plurality of VR cameras, wherein a FOV of a user camera device of the plurality of user camera devices is linked with a FOV of a relevant camera module of the plurality of VR cameras based on at least a threshold degree of similarity between the FOV of the user camera device and the FOV of the relevant camera module; and
create an event VR content by combining the plurality of VR contents and the plurality of video contents based on the linking of the FOVs of the plurality of user camera devices with FOVs of the relevant camera modules of the plurality of VR cameras.

18. The computer program product as claimed in claim 17, wherein the apparatus is further caused, at least in part to perform a registration of the plurality of user camera devices with the at least one processor for enabling the plurality of user camera devices to provide the plurality of video contents.

19. The computer program product as claimed in claim 17, wherein for linking the FOV of the user camera device with the FOV of the relevant camera module, the apparatus is further caused, at least in part to:
   determine degrees of similarity between an image frame associated with a video content received from the user camera device and views associated with the plurality of VR contents; and
   determine a camera module, having highest degrees of similarity, as a relevant camera module if the similarity between the image frame and view of the camera module is more than a threshold degree of similarity.

20. The computer program product as claimed in claim 17, wherein for linking the FOV of the user camera device with the FOV of the relevant camera module, the apparatus is further caused, at least in part to:
   determining degrees of similarity between an orientation of the user camera device and orientations of camera modules of the plurality of VR cameras; and
   determining a camera module, having highest degrees of similarity, as the relevant camera module, if the degrees of similarity between the orientation of the user camera device and an orientation of the camera module is more than a threshold degree.

* * * * *